April 17, 1951   H. SCHUETT   2,549,244
SURVEYING INSTRUMENT
Filed Jan. 17, 1949
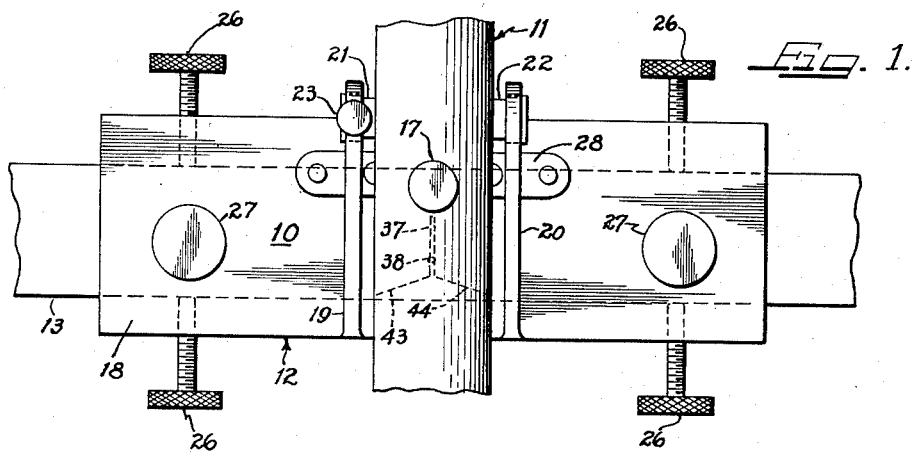
Fig. 1.
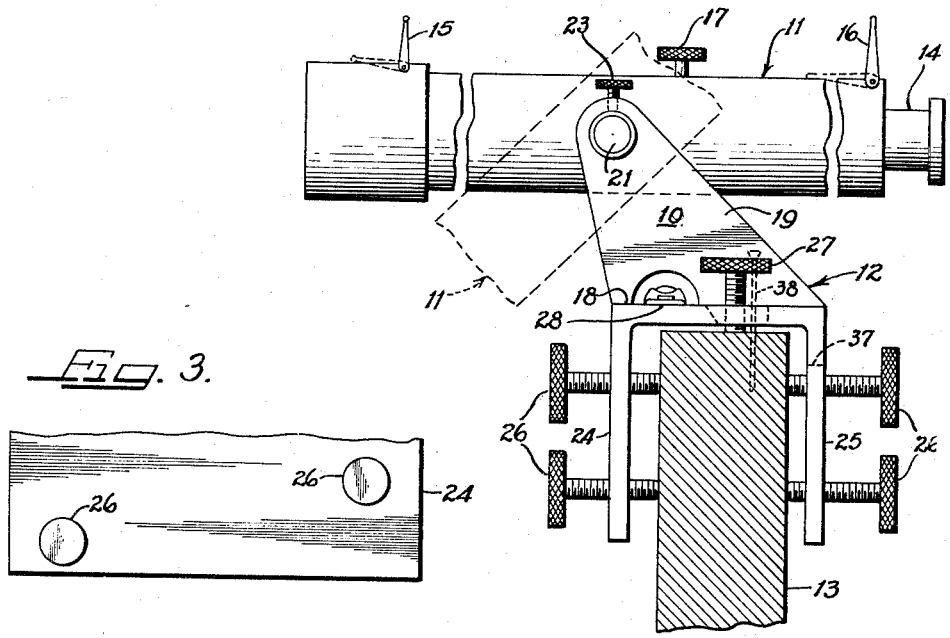
Fig. 3.
Fig. 2.
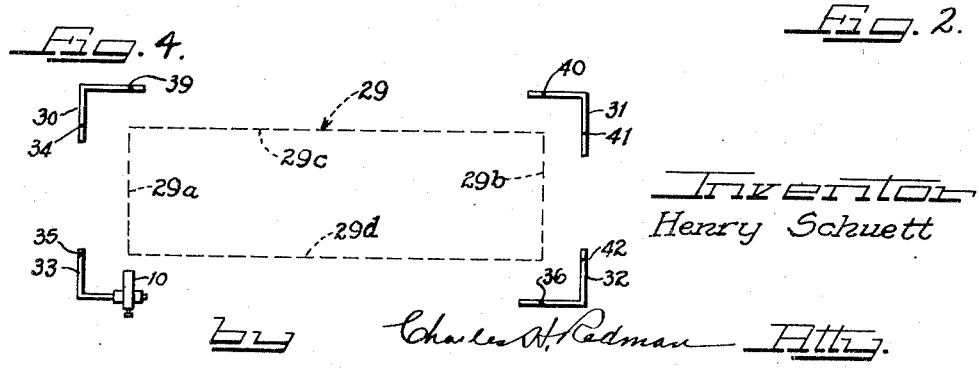
Fig. 4.
Inventor
Henry Schuett
by Charles H. Redman Atty.

Patented Apr. 17, 1951

2,549,244

UNITED STATES PATENT OFFICE 2,549,244

SURVEYING INSTRUMENT

Henry Schuett, Algonquin, Ill.

Application January 17, 1949, Serial No. 71,369

4 Claims. (Cl. 33—46)

This invention relates to geometrical instruments and more particularly to a simple surveying instrument adapted for adjustable clamping attachment to a support.

In various types of construction operations, work lines are usually laid out by the horizontal stretching or the vertical hanging of cords and wires. This layout work consumes considerable time of trained personnel. Frequently, the layout work lines are numerous and so located as to interfere with the movements of workmen. As a result, the lines often are inadvertently moved out of alignment. Displacement may also be effected by animals and wind, or by the stretching or shrinkage of the lines. No matter what the cause, movement or displacement either effects a loss of time in making corrections or inaccuracies in the finished work.

This invention seeks to provide a simple and inexpensive sighting instrument for use in laying out both horizontal and vertical lines. The advantages of using such an instrument are numerous. Straight lines are quickly laid out, the length of which is limited only by accurate sighting. They may be located permanently by staking or other markings. The instrument, because it can be clamped to a support, may be moved quickly and easily from one location to another. Unlike the laying out of work by lines, the instrument of this invention is so simple as to be operable by any workman without special training. And the probability of displacement by humans, animals or atmospheric conditions of a small instrument is much less than of long lines.

It is, therefore, an important object of this invention to provide a sighting instrument so constructed as to be adjustably clamped to a support.

Another object of the invention is the provision of a surveying instrument adapted for clamping attachment to a support and being adjustable thereon in horizontal and vertical planes.

Still another object of this invention is the provision of a sighting instrument which may easily, quickly and accurately be located at a predetermined point on a support.

A still further object of the invention is the provision of a simple device which eliminates the use of horizontal and vertical lines in laying out construction work.

Another and still further object of this invention is the provision of a sighting instrument which is simple in construction, economical to manufacture, and highly efficient in operation.

Other and further objects of the invention will become apparent to those skilled in the art from the following detailed description of the preferred embodiment of the invention as disclosed in the annexed sheet of drawings:

On the drawings:

Figure 1 is a fragmentary plan view of the sighting or surveying instrument of this invention;

Figure 2 is a broken elevational view of the device in Figure 1 as seen from the left thereof;

Figure 3 is a reduced fragmentary side view of the supporting structure showing the staggered relation of the clamping screws thereon; and Figure 4 is a view illustrating the manner in which the device of this invention may be used.

As shown on the drawings:

The optical instrument 10 shown in Figures 1 and 2 generally comprises a telescope 11 and a clamping base or bracket 12. While shown in combination with a telescope, it is to be understood that the base or bracket to be described more fully hereinafter may equally well mount any other type of instrument adapted to be clamped to a support.

In the present arrangement, the instrument 10 is shown mounted on a support 13 which may be any member sufficiently narrow to fit in the bracket.

The telescope 11 is of the usual construction for aiding in viewing distant objects and includes a reticle and an object lens, neither of which are shown, and an adjustable eye piece 14. If desired, foldable sights 15 and 16 are provided on the top of the telescope by which to initially sight the instrument on a distant object in order to quickly locate the object through the lenses. Adjustment of the lenses for sharp vision is accomplished by turning the thumb screw 17.

The clamping bracket 12 has a web 18 from which extend two pairs of spaced legs. One pair of the legs, 19 and 20, are provided with openings for receiving pivot arms 21 and 22 carried by the telescope. A thumb screw 23 is threaded through a portion of the leg 19 to engage the pivot arm 21 and lock the telescope in a position to which it is swung. As best shown in Figure 2, the legs 19 and 20 are so constructed as to position the telescope pivots in near alignment with the front face of the bracket. This permits a greater arc of swing of the telescope and particularly increases the arc of depression as shown in dotted lines.

A second pair of legs, 24 and 25, depend from the web 18 and form a yoke. Binding screws 26, 26 serve to clamp the yoke to the support. It will be observed in Figure 3 that the screws in the leg 24 are located in staggered relation. The screws in the leg 25 are similarly staggered but so located that adjacent screws in the legs are directly opposite each other. This is shown in Figures 1 and 2. The staggered arrangement of pairs of the screws eliminates rocking of the bracket on the support which results when the screws are all in horizontal alignment. By threading in the same direction the screws of a pair at one end of the bracket, adjustment of the bracket relative to the support is effected in a horizontal plane.

It is preferred that the pair of legs 19 and 20 be arranged in right angular relation to the legs 24 and 25. By this arrangement the telescope extends in a direction normal to the support which is desired for reasons to become more apparent hereinafter. However, this angular relationship may be varied if the use of the instrument so dictates.

When the telescope is mounted on a support it is important that its pivotal axis be horizontal. If not, the plane of movement of the instrument will not be vertical and a line of sight described on a surface by the sighting axis will not run directly from said axis as a continuation thereof but in diagonal relation thereto.

To effect the proper adjustment of the bracket in the plane of the support, which in this case is in a vertical direction, binding screws 27, 27 are provided in the web 18 near the ends of the bracket. When one of the screws is threaded toward or away from the support, the adjacent end of the bracket is raised or lowered relative thereto.

A level 28, shown in the drawing as being of the vial type, is provided to aid in adjusting the web 18 to a true horizontal position. The pivots 21 and 22 are located equidistantly from the web whereby an adjustment of the web simultaneously adjusts the rotational axis of the telescope.

In Figure 4 is shown one of the many uses of the instrument of this invention in construction operations. An outline for an excavation 29 is indicated by dotted lines. Batterboards, forming corner markers 30, 31, 32 and 33, are usually provided by which to indicate a desired level and to mark outlines by means of stretched and hanging strings or wires.

In the present instance, the desired width of the excavation is measured on the corner markers 30 and 33 and the points marked as at 34 and 35 preferably by nails or other wire members. The length of the excavation is measured and identified by nails, only one, at 36, of which is shown on the corner marker 32. The nail on the corner marker 33 is covered by the sighting instrument clamped thereon.

It is necessary that some means be provided on the instrument bracket for engaging the nail or wire marker to properly locate the telescope on the support. That is, the bracket should be so located on the support that the vertically extending nail lies in a plane defined by the sighting axis of the telescope as the latter rotates on its pivots. This is accomplished by providing a slot 37 in the web 18 of the bracket within which a nail marker, such as the nail 38 shown in Figure 2, is received. As shown in Figures 1 and 2, the entrance to the slot 37 may be enlarged by the sloping edges 43 and 44 to facilitate passage of a nail therein. With the nail as a fulcrum, the web is adjusted to a horizontal position as indicated on the level 28. In this position, the telescope is properly located on the support relative to the nail. Whatever horizontal adjustment is necessary is then made to sight the telescope on a marker nail placed in a batterboard in the opposite corner marker.

When located in line with point 39, as shown in Figure 4, the end 29a of the excavation may be laid out along the line of sight as indicated by the reticle. If desired, the excavation may be made with the end line checked frequently for accuracy of excavation or the line may be identified by stakes set out in the same way as in surveying. Identification of the opposite end line 29b is accomplished by setting the instrument over nail 36 and sighting at point 40. The sides 29c and 29d of the excavation are similarly identified. For side 29c, the instrument is located over nail 34 and sighted on nail 41; for side 29d, the instrument is located over nail 35 and sighted on nail 42.

Actually, the batterboard corner markers are set very closely to the exavation sides so that the telescope may be depressed to check the vertical and longitudinal accuracy of the excavation.

It will be apparent from the foregoing that straight lines from any point on a support may easily be laid out with the instrument of this invention. In addition, the instrument may be used for aligning objects such as columns, stakes, trees, or the like.

Although this instrument is simple it has been found to be extremely valuable and effective in building and construction operations of all kinds.

The invention has been described herein more or less precisely as to details, yet it is to be understood that the invention is not limited thereby, as changes may be made in the arrangement and proportion of parts and equivalents may be substituted, without departing from the spirit and scope of the invention.

I claim as my invention:

1. A sighting device comprising a telescope, a base having a web and pairs of spaced legs extending from opposite sides thereof, said pairs of legs being in angular relation to each other, one pair of legs forming a cradle, pivots supporting said telescope within said cradle, binding screws extending through said web and the legs of the other pair for clamping the base to a support, the screws in each leg being located in staggered relation and in both legs being located in opposed relation, and a slot in said web adapted to receive therein a nail or other point locating wire in the support for locating the telescope thereon in a predetermined location.

2. Supporting means for an optical or other instrument, comprising a bracket having a web and depending legs and a cradle for carrying the instrument, said legs and cradle being located on opposite sides of said web, binding screws in said web and depending legs for clamping the bracket to a support, the screws in each leg being in staggered relation and in said legs in opposed relation, and a slot in the web adapted to receive a nail or other point locating wire in the support for locating the instrument thereon in a predetermined location.

3. Supporting means for an optical or other instrument, comprising a bracket having a web and pairs of spaced legs extending from opposite sides thereof, said pairs of legs being in angular relation to each other, one pair of legs forming a cradle for said instrument, binding screws on said web and the legs of the other of said pairs for clamping the bracket to a support, the screws on each leg being in staggered relation and on both legs in opposed relation, and a slot in said web adapted to receive therein a nail or other point locating wire in the support for locating the instrument thereon in a predetermined location.

4. Supporting means for an optical or other instrument, comprising a bracket having a web and pairs of spaced legs extending from opposite sides thereof, said pairs of legs being in right angular relation to each other, one pair of legs adapted to cradle said instrument, binding screws on said web and the legs of the other of said pairs for clamping the bracket to a support, the screws on said legs cooperating to adjust the cradled instrument in one plane and the screws on said web cooperating to adjust the instrument in another plane, and a level on said web by which to aid in making said adjustments.

HENRY SCHUETT.

REFERENCES CITED

The following references are of record in the file of this patent:

UNITED STATES PATENTS

| Number | Name | Date |
|---|---|---|
| 339,072 | Nies | Mar. 30, 1886 |
| 685,455 | Kinkead | Oct. 29, 1901 |
| 800,590 | Morris | Sept. 26, 1905 |
| 937,480 | Smith et al. | Oct. 19, 1909 |
| 1,189,422 | Bodmer | July 4, 1916 |
| 1,476,077 | Hort | Dec. 4, 1923 |
| 1,693,170 | Alsop | Nov. 27, 1928 |
| 1,830,345 | Anderson | Nov. 3, 1931 |
| 1,903,333 | Botel | Apr. 4, 1933 |
| 1,918,550 | McLaughlin | July 18, 1933 |
| 2,127,744 | Linthwaite | Aug. 23, 1938 |
| 2,235,898 | Niemeyer | Mar. 25, 1941 |
| 2,285,281 | Johnson | June 2, 1942 |
| 2,497,933 | Devers | Feb. 21, 1950 |

FOREIGN PATENTS

| Number | Country | Date |
|---|---|---|
| 117,143 | Great Britain | July 11, 1918 |